United States Patent
Shao et al.

(10) Patent No.: US 9,386,257 B2
(45) Date of Patent: *Jul. 5, 2016

(54) APPARATUS, SYSTEM AND METHOD OF CONTROLLING WIRELESS TRANSMISSION OF VIDEO STREAMS

(71) Applicant: Intel Corporation, Santa Clara, CA (US)

(72) Inventors: Lei Shao, Santa Clara, CA (US); Peng Ge, Hillsboro, OR (US); Radhakrishnan Sankar, Cupertino, CA (US); Inching Chen, Portland, OR (US); Ulun Karacaoglu, San Diego, CA (US); Xintian E. Lin, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,474

(22) Filed: Aug. 15, 2013

(65) Prior Publication Data

US 2015/0049250 A1   Feb. 19, 2015

(51) Int. Cl.
*H04N 21/2343* (2011.01)
*H04N 5/445* (2011.01)
(Continued)

(52) U.S. Cl.
CPC ........... *H04N 5/44591* (2013.01); *H04N 19/10* (2014.11); *H04N 19/162* (2014.11); *H04N 19/164* (2014.11); *H04N 19/166* (2014.11); *H04N 21/2343* (2013.01); *H04N 21/234363* (2013.01); *H04N 21/234381* (2013.01);
(Continued)

(58) Field of Classification Search
CPC ... H04N 19/10; H04N 19/162; H04N 19/164; H04N 19/166; H04N 21/234363; H04N 21/234381; H04N 21/2343
See application file for complete search history.

(56) References Cited

U.S. PATENT DOCUMENTS

| 7,543,327 B1 * | 6/2009 | Kaplinsky | ........ G08B 13/19656 |
| | | | 348/143 |
| 2001/0017887 A1 * | 8/2001 | Furukawa | ............ H04N 19/139 |
| | | | 375/240.03 |

(Continued)

FOREIGN PATENT DOCUMENTS

| JP | 2006033884 | * | 2/2006 |
| JP | 2006033884 A | * | 2/2006 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

(Continued)

*Primary Examiner* — Robert Hance
(74) *Attorney, Agent, or Firm* — Shichrur & Co.

(57) ABSTRACT

Some demonstrative embodiments include apparatuses, systems and/or methods of controlling wireless transmission of video streams. For example, an apparatus may include a controller to control one or more windows to be displayed by a display device, the one or more windows to display video of one or more wireless video streams of a plurality of wireless video streams transmitted by a plurality of video sources, the controller is to request at least one video source of the plurality of video sources to set one or more attributes of a video stream transmitted by the video source based on at least one predefined criterion.

26 Claims, 4 Drawing Sheets

(51) Int. Cl.
*H04N 19/166* (2014.01)
*H04N 19/162* (2014.01)
*H04N 19/164* (2014.01)
*H04N 19/10* (2014.01)
*H04N 21/41* (2011.01)
*H04N 21/431* (2011.01)
*H04N 21/436* (2011.01)
*H04N 21/4363* (2011.01)
*H04N 21/462* (2011.01)

(52) U.S. Cl.
CPC ....... *H04N21/4122* (2013.01); *H04N 21/4312* (2013.01); *H04N 21/43615* (2013.01); *H04N 21/43637* (2013.01); *H04N 21/4622* (2013.01)

(56) References Cited

U.S. PATENT DOCUMENTS

| | | | | |
|---|---|---|---|---|
| 2003/0126492 A1* | 7/2003 | Cavin | ............... | H04L 1/0002 714/4.1 |
| 2003/0140159 A1 | 7/2003 | Campbell et al. | | |
| 2004/0184523 A1* | 9/2004 | Dawson | ............... | H04N 7/17318 375/240.1 |
| 2005/0195899 A1 | 9/2005 | Han | | |
| 2005/0213502 A1 | 9/2005 | Convertino et al. | | |
| 2007/0024705 A1* | 2/2007 | Richter | ............... | H04N 7/17318 348/142 |
| 2010/0050221 A1* | 2/2010 | McCutchen | ........... | H04N 7/165 725/109 |
| 2010/0106770 A1 | 4/2010 | Taylor et al. | | |
| 2011/0179455 A1* | 7/2011 | Thompson | ............... | H04L 47/10 725/82 |
| 2011/0296109 A1* | 12/2011 | Sood | ............... | H04N 21/4331 711/118 |
| 2012/0042275 A1 | 2/2012 | Neerudu et al. | | |
| 2012/0076199 A1 | 3/2012 | Gao et al. | | |
| 2012/0106669 A1* | 5/2012 | Rao | ............... | H04N 19/172 375/295 |
| 2012/0284650 A1 | 11/2012 | Chang et al. | | |
| 2013/0195119 A1* | 8/2013 | Huang | ............... | H04L 65/4092 370/468 |
| 2013/0290395 A1* | 10/2013 | Vullings | ............... | H04L 67/10 709/201 |
| 2013/0293668 A1* | 11/2013 | Gu | ............... | H04N 7/147 348/14.13 |

OTHER PUBLICATIONS

IEEE Std 802.11 ad™-2012. IEEE Standard for Information technology—Telecommunications and information exchange between systems Local and Metropolitan area networks—Specific requirements, Part 11: Wireless LAN Medium Access Control (MAC) and Physical Layer (PHY) Specifications, Amendment 3: Enhancements for Very High Throughput in the 60 GHz Band, Dec. 28, 2012.
Wireless Gigabit Alliance (WGA) Specifications; WiGig MAC and PHY Specification Version 1.1, Apr. 2011—Final Specification; 442 pages.
Wi-Fi Peer-to-Peer (P2P) Technical Specification V1.2; Wi-Fi Alliance Technical Committee P2P Task Group; Oct. 4, 2010; 160 pages.
Office Action for U.S. Appl. No. 14/197,383, mailed on Feb. 23, 2015, 19 pages.
International Search Report and Written Opinion for International PCT Application No. PCT/US2014/051028, mailed on Nov. 21, 2014, 9 pages.
Office Action for U.S. Appl. No. 14/197,383, mailed on May 29, 2015, 24 pages.
Final Office Action for U.S. Appl. No. 14/197,383, mailed Sep. 21, 2015, 11 pages.
Notice of Allowance for U.S. Appl. No. 14/197,383, mailed on Jan. 20, 2016, 17 pages.
International Preliminary Report on Patentability for PCT/US2014/051028, mailed on Feb. 25, 2016, 8 pages.

* cited by examiner

APPARATUS, SYSTEM AND METHOD OF CONTROLLING WIRELESS TRANSMISSION OF VIDEO STREAMS

TECHNICAL FIELD

Embodiments described herein generally relate to apparatus, system and method of controlling wireless transmission of video streams.

BACKGROUND

Wireless Display (WiDi) technology enables sharing video content from a device such as a tablet, a notebook, and/or the like. The video content from the device may be transmitted over a wireless channel to a display device, for example, a screen, a projector, a television (TV) and/or the like, which may be configured to display the video content on a larger display compared to a screen of the device.

For example, the WiDi technology may enable a teacher in a class of students to display video content from a tablet of one of the students, e.g., a homework assignment, on the large display, which may enable the students in the class to view the video content.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
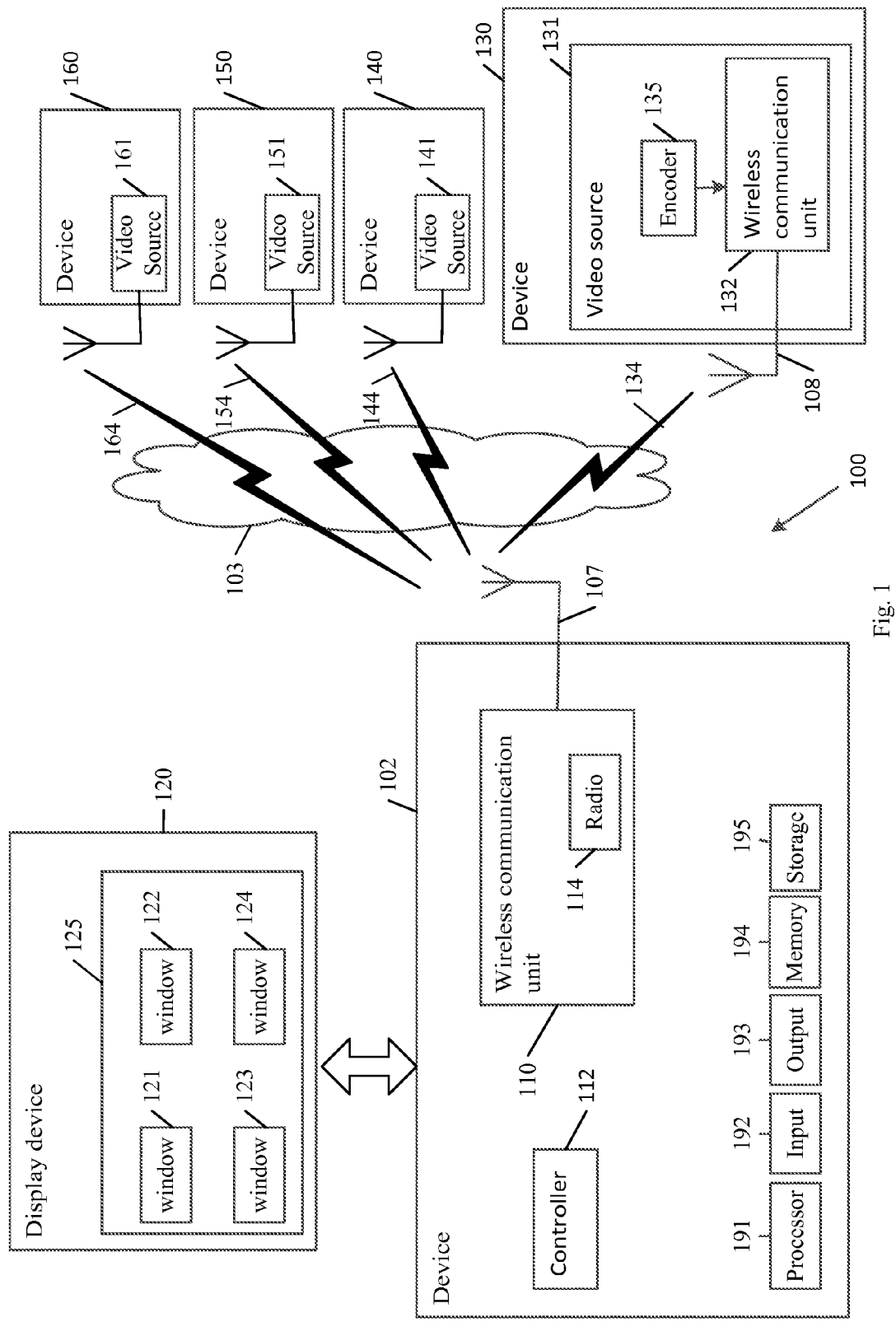
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control (MAC) and Physical Layer (PHY) Specifications,* Mar. 29, 2012; *IEEE*802.11 *task group ac (TGac)* ("*IEEE*802.11-09/0308*r*12—*TGac Channel Model Addendum Document*"); *IEEE* 802.11 *task group ad (TGad)* (*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band,* 28 Dec., 2012)) and/or future versions and/or derivatives thereof, devices and/or networks operating in accordance with existing WirelessHD™ specifications and/or future versions and/or derivatives thereof, units and/or devices which are part of the above networks, devices and/or networks operating in accordance with existing Intel Wireless Display (WiDi) specifications and/or future versions and/or derivatives thereof, devices and/or networks operating in accordance with existing Miracast™ specifications and/or future versions and/or derivatives thereof, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102, 130, 140, 150 and/or 160, capable of communicating content, data, information and/or signals over a wireless communication medium 103, for example, a radio channel, an IR channel, a RF channel, a Wireless Fidelity (WiFi) channel, a wireless display (WiDi) channel and the like. One or more elements of system 100 may optionally be capable of communicating over any suitable wired communication links.

In some demonstrative embodiments, wireless communication devices 102, 130, 140, 150 and/or 160 may include a mobile device. In other embodiments, devices 102, 130, 140, 150 and/or 160 may include a non-mobile device.

In some demonstrative embodiments, wireless communication devices 102, 130, 140, 150 and/or 160 may include, for example, a PC, a desktop computer, a mobile computer, a laptop computer, a notebook computer, a tablet computer, an Ultrabook™ computer, a mobile internet device, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, a video sink, a stereo tuner, a flat panel display, a Personal Media Player (PMP), a digital video camera (DVC), a gaming device, a Digital Still camera (DSC), a media player, a Smartphone, a television, or the like.

In some demonstrative embodiments, wireless communication devices 102, 130, 140, 150 and/or 160 may also include, for example, a processor 191, an input unit 192, an output unit 193, a memory unit 194, and a storage unit 195. Wireless communication devices 102, 130, 140, 150 and/or 160 may optionally include other suitable hardware components and/or software components. In some demonstrative embodiments, some or all of the components of mobile device wireless communication devices 102, 130, 140, 150 and/or 160 may be enclosed in a common housing or packaging, and may be interconnected or operably associated using one or more wired or wireless links. In other embodiments, components of wireless communication devices 102, 130, 140, 150 and/or 160 may be distributed among multiple or separate devices.

Processor 191 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 102 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by device 102.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, wireless medium 103 may include for example, a Radio Frequency (RF) channel, channel, a WiFi channel, a wireless display (WiDi) channel, a Bluetooth channel, a cellular channel, a Global Navigation Satellite System (GNSS) Channel, a Near Field Communication (NFC) channel, a Hybrid Digital Radio (HDR) channel, a Frequency Modulation (FM) channel, and the like.

In some demonstrative embodiments, wireless communication devices 102, 130, 140, 150 and/or 160 may include wireless communication units to perform wireless communication between wireless communication devices 102, 130, 140, 150 and/or 160 and/or with one or more other wireless communication devices. For example, device 102 may include a wireless communication unit 110, and/or device 130 may include a wireless communication unit 132.

In some demonstrative embodiments, the wireless communication units of devices 102, 130, 140, 150 and/or 160 may include, for example, one or more radios. For example, wireless communication unit 110 may include a radio 114. For example, radio 114 may include one or more wireless transmitters, receivers and/or transceivers able to send and/or receive wireless communication signals, RF signals, frames, blocks, transmission streams, packets, messages, data items, and/or data. For example, wireless communication units 110 and/or 132 may include or may be implemented as part of a wireless Network Interface Card (NIC), and the like.

In some demonstrative embodiments, the wireless communication units of devices 102, 130, 140, 150 and/or 160 may include, or may be associated with, one or more antennas. For example, wireless communication unit 110 may be associated with antennas 107, and/or wireless communication unit 132 may be associated with antennas 108. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, system 100 may include a display device 120 to display video content on a screen 125.

In some demonstrative embodiments, display device 120 may be implemented as part of device 102. For example, device 102 may include an all in one (AIO) computing device, a smart board and/or the like. For example, screen 125 may include an LCD screen, a light electric diode (LED) screen, a touchscreen and/or the like.

In some demonstrative embodiments, display device 120 and device 102 may be implemented as separate elements of system 100. For example, device 102 may include a computing device, e.g., a personal computer, a notebook, a server, and/or the like, connected to display device 120, which may include a projector, a plasma TV, an LCD display and/or the like. For example, screen 125 may include a projected screen, a screen of a plasma TV or an LCD monitor.

In some demonstrative embodiments, display device 120 may be configured to display one or more windows to display the video content on screen 125.

In some demonstrative embodiments, display device 120 may be configured to display a window 121, a window 122, a window 123, and/or a window 124.

In some demonstrative embodiments, display device 120 may be configured to display a single window, e.g., occupying the entirety of screen 125. For example, display 120 may be configured to display window 121 occupying the entirety of screen 125.

In some demonstrative embodiments, display device 120 may be configured to display two or more windows, e.g., three windows, four windows, eight windows and/or any other number of windows. For example, display device 120 may be configured to display two or more windows of windows 121, 122, 123 and/or 124.

In some demonstrative embodiments, the two or more windows may be displayed concurrently. For example, screen 125 may be divided into two parts to display two windows side by side, four non-overlapping parts to display four windows, and/or any other number of parts to display any other number of windows.

In some demonstrative embodiments, displaying two or more windows concurrently may enable concurrently displaying different video content in each of the windows.

In one example, display device 120 may be configured to display windows 121, 122, 123 and/or 124 concurrently, such that each window of windows 121, 122, 123 and/or 124 may display different video content. For example, window 121 may display video of a document, window 122 may display video of a webpage, window 123 may display video of a movie and/or window 124 may display video captured by a web camera.

In some demonstrative embodiments, a user of device 102 may control display device 120. For example, the user may control one or more displayed windows of windows 121, 122, 123 and/or 124.

In some demonstrative embodiments, the user may utilize input 192, e.g., a mouse, a keyboard, a pointing device, and/or the like, to control the one or more windows.

In some demonstrative embodiments, the user of device 102 may control a displayed window, for example, by moving the window around screen 125 and/or by resizing the window.

In some demonstrative embodiments, the user of device 102 may control two or more displayed windows, for example, by selecting one or more of windows 121, 122, 123, and/or 124 to be displayed; and/or by selecting an active window of windows 121, 122, 123, and/or 124, in which one or more operations may be performed by the user, e.g., marking text in a video of a document displayed in the active window, playing or stopping a video of a movie displayed in the active windows and/or the like.

In some demonstrative embodiments, display device 120 may be configured to display video from one or more remote video sources, for example, video generated by devices 130, 140, 150 and/or 160.

In some demonstrative embodiments, devices 130, 140, 150 and/or 160 may include a plurality of video sources to generate video. For example, device 130 may include a video source 131, device 140 may include a video source 141, device 150 may include a video source 151, and/or device 160 may include a video source 161.

In some demonstrative embodiments, the video generated by video sources 131, 141, 151 and/or 161 may be displayed on screens of devices 130, 140, 150 and/or 160. For example, a screen of device 130 may display video of a movie, a web browser, a presentation and/or the like, generated by video source 131.

In some demonstrative embodiments, wireless communication devices 130, 140, 150 and/or 160 may be configured to enable displaying video generated by video sources 130, 140, 150 and/or 160 on a remote display, e.g., instead of and/or in addition to the screens of devices 130, 140, 150 and/or 160. For example, a video generated by video source 131 may be displayed on the screen of device 130 and by display device 120.

In some demonstrative embodiments, wireless communication devices 130, 140, 150 and/or 160 may transmit the video generated by video sources 131, 141, 151 and/or 161 to device 102, e.g., to enable displaying the video on display 120.

In some demonstrative embodiments, wireless communication devices 130, 140, 150 and/or 160 may transmit the video generated by video sources 131, 141, 151 and/or 161 via a plurality of wireless video streams.

In some demonstrative embodiments, wireless communication device 130 may be configured to transmit to device 102, e.g., via wireless communication unit 132 and antennas 108, a wireless video stream 134 including video generated by video source 131; wireless communication device 140 may be configured to transmit to device 102 a wireless video stream 144 including video generated by video source 141; wireless communication device 150 may be configured to transmit to device 102 a wireless video stream 154 including video generated by video source 151; and/or wireless communication device 160 may be configured to transmit to device 102 a wireless video stream 164 including video generated by video source 161.

In some demonstrative embodiments, wireless video streams 134, 144, 154, and/or 164 may be transmitted over wireless communication medium 103 via a Wireless Display (WiDi) link, a Wireless Fidelity (WiFi) link, a wireless gigabit (WiGig) Display Extension (WDE) link, and/or any other suitable channel or link.

In some demonstrative embodiments, wireless communication unit 110 may receive wireless video streams 134, 144, 154, and/or 164, e.g., via antennas 107.

In some demonstrative embodiments, device 102 may be configured to control display device 120 to display the video of wireless video streams 134, 144, 154, and/or 164.

In one example, system 100 may be deployed in a class of students. Devices 130, 140, 150 and/or 160 may include portable devices, e.g., laptops or tablets, to be used by the students, and device 102 may include a smart board having a large screen to be used by a teacher of the class. Devices 130, 140, 150 and/or 160 may transmit video to device 102 representing, for example, homework assignments, which may be prepared and/or stored on the tablets by the students. Device 102 may receive the video representing the homework assignments. The teacher may be able to display one of the homework assignments on the large screen of the smart board, which may enable all of the students in the class to view the assignment.

In some demonstrative embodiments, devices 130, 140, 150 and/or 160 may concurrently transmit wireless video streams 134, 144, 154, and/or 164, and display device 120 may concurrently display video of two or more different wireless video streams.

In some demonstrative embodiments, device 102 may implement a WiDi M-to-1 streaming, which may enable M streams to be concurrently displayed on one display. For example, WiDi M-to-1 streaming may enable displaying video of wireless video streams 134, 144, 154, and/or 164 by display device 120.

In some demonstrative embodiments, display device 120 may be configured to display video in two displaying modes, e.g., a single viewport window to display a single window occupying the entirety of screen 125, and multiple non-overlapped viewport windows to concurrently display video of a plurality of video streams.

In some demonstrative embodiments, display device 120 may be configured to display the video of the two or more different wireless video streams in two or more windows of windows 121, 122, 123, and/or 124.

In one example, display device 120 may be configured to display window 121 to display video of wireless video stream 134 and window 122 to display video of wireless video stream 144. For example, the user of device 102 may select to view the video of wireless video streams 134 and 144 such that windows 121 and 122 are displayed side by side on screen 125.

In another example, display device 120 may be configured to display windows 121, 122, 123 and 124 to display video of video streams 134, 144, 154 and 164, respectively. For example, the user of device 102 may select to view video of wireless video streams 134, 144, 154 and 164, such that screen 125 is divided into four non-overlapping parts displaying the video of wireless video streams 134, 144, 154 and/or 164 in windows 121, 122, 123 and 124.

In some demonstrative embodiments, devices 130, 140, 150 and/or 160 may include one or more encoders configured to encode the video of video sources 131, 141, 151, and/or 161. For example, device 130 may include an encoder 135 configured to encode the video generated by video source 131.

In some demonstrative embodiments, the one or more encoders may enable transmitting the video via wireless video streams 134, 144, 154, and/or 164. For example, encoder 135 may compress and/or process the video of video source 131 to enable transmitting the encoded video via wireless video stream 134.

In some demonstrative embodiments, the encoders may encode the video of video sources 131, 141, 151, and/or 161 according to one or more encoding attributes.

In some demonstrative embodiments, the one or more encoding attributes may include a resolution of the video, a frame rate of the video, a bit rate of the video, and/or any other attribute.

In one example, encoder 135 may encode video of video source 131 at a resolution having a width of 1024 pixels and a height of 768 pixels (1024×768), a frame rate of 30 frames per second (FPS), and/or a bit rate of ten Mega bit per second (Mbps), and wireless communication unit 132 may transmit the video via wireless video stream 134.

In some demonstrative embodiments, the encoding attributes of a video stream may affect a bandwidth required for transmitting the video stream over wireless medium 103.

In some demonstrative embodiments, increasing the resolution of the video stream may increase the bandwidth required for transmitting the video stream, increasing the frame rate of the video stream may increase the bandwidth required for transmitting the video stream, and/or increasing the bit rate of the video stream may increase the bandwidth required for transmitting the video stream.

For example, a first wireless video stream including video encoded at a relatively low resolution, a relatively low frame rate and/or a relatively low bit rate may require less bandwidth than a second wireless video stream including video encoded at a relatively high resolution, a relatively high frame rate and/or a relatively high bit rate.

In some demonstrative embodiments, a wireless bandwidth of wireless medium 103 may have a limited wireless bandwidth capacity, for example, due to hardware specification of a device, e.g., a PC, which provides access to wireless medium 103; and/or due to co-channel RF interference, for example, resulting from WiFi communication between one or more wireless devices, RF transmissions by other devices, e.g., a microwave oven, and/or any other interference resulting from any other RF transmitter or source.

In some demonstrative embodiments, wireless video streams 134, 144, 154, and/or 164 may require a wireless bandwidth capacity, which is greater than the limited wireless bandwidth capacity of wireless medium 103.

In one example, the required bandwidth capacity may be greater than the limited bandwidth capacity, for example, if all wireless video streams 134, 144, 154, and 164 are transmitted concurrently and/or the video of wireless video streams 134, 144, 154, and/or 164 requires a relatively high bandwidth, e.g., resulting from the one or more encoding attributes.

In some demonstrative embodiments, wireless video streams 134, 144, 154, and 164 may experience random audio/video drop, glitches of the video, and/or a relatively increased video latency, which may cause a relatively poor user experience (UX), for example, if the required bandwidth capacity is greater than the limited bandwidth capacity of wireless medium 103.

The phrase "user experience" (UX), as used herein, may refer, for example, to emotions of a user of a device, a system and/or a service about using the device, the system and/or the service. For example, the user experience may emphasize experiential, affective, meaningful and/or valuable aspects of human-computer interaction. Additionally, the user experience may include perceptions of the user with respect to the device, for example, a utility, an ease of use and/or an efficiency of the device.

Some demonstrative embodiments may reduce the wireless bandwidth utilization, and improve user experience at a wireless bandwidth limited environment.

Some demonstrative embodiments may utilize at least one of two closed-loop dynamic video encoder parameter adaptation algorithms to reduce the wireless bandwidth utilization, e.g., as described below.

In some demonstrative embodiments, device 102 may utilize information with respect to wireless video frames, display device 120 and/or the one or more windows to feedback values of the encoding attributes to the one or more encoders. The one or more encoders may dynamically adjust the encoding attributes, e.g., based on the received feedback, e.g., as described below.

In some demonstrative embodiments, device 102 may include a controller 112 configured to control one or more windows of windows 121, 122, 123 and/or 124 to display video of one or more wireless video streams of wireless video streams 134, 144, 154, and/or 164.

In one example, device 102 may utilize a user input back channel (UIBC) to remotely control video sources 131, 141, 151, and/or 161 for displaying the one or more wireless video streams of wireless video streams 134, 144, 154, and/or 164.

In some demonstrative embodiments, controller 112 may request at least one video source of video sources 131, 141, 151 and/or 161 to set one or more attributes of a video stream transmitted by the video source based on at least one predefined criterion, e.g., as described below.

In some demonstrative embodiments, the one or more attributes may include a resolution of the video stream, a frame rate of the video stream, a bit rate of the video stream, whether or not the video stream is to be transmitted, and/or any other attribute.

In some demonstrative embodiments, controller 112 may control wireless communication unit 110 to transmit a feedback to the video source. For example, controller 112 may utilize a protocol built on top of Miracast™ or any other mechanism to transmit the feedback to the video source.

In some demonstrative embodiments, the feedback may include an indication of the one or more attributes.

In some demonstrative embodiments, the video source may receive the feedback, and may encode the video stream according to the one or more attributes received in the feedback.

For example, controller 112 may send feedback to device 130 to request video source 131 to set one or more attributes of a video stream transmitted via wireless video stream 134 based on the at least one predefined criterion. Device 130 may receive the feedback and may control encoder 135 to encode the video stream according the one or more attributes.

In some demonstrative embodiments, the at least one predefined criterion may include one or more window attributes relating to windows 121, 122, 123 and/or 124, e.g., as described below.

In some demonstrative embodiments, the one or more window attributes may include a number of the one or more windows to be displayed, a resolution of a window of windows 121, 122, 123 and/or 124, whether or not the window is active, and/or any other attribute.

In some demonstrative embodiments, controller 112 may be configured to monitor the one or more window attributes. For example, controller 112 may receive information, e.g., from display device 120, relating to the number of the one or more windows to be displayed, the resolution of a window currently displayed on screen 125, and/or any other attribute of the windows.

In some demonstrative embodiments, controller 112 may request a video source of video sources 130, 140, 150 and/or 160 to set a resolution of a video stream generated by the video source based on the number of the one or more windows to be displayed.

In some demonstrative embodiments, controller 112 may request the video source to set a first resolution of the video stream if a first number of windows is to be displayed on screen 125, and a second resolution, e.g., lesser than the first resolution, if a second number of windows is to be displayed on screen 125, for example, if the second number of windows is greater than the first number of windows.

In some demonstrative embodiments, setting the second resolution of the video stream may reduce a bandwidth required to transmit the video stream, e.g., compared to a bandwidth required to transmit the video stream encoded according to the first resolution.

In some demonstrative embodiments, controller 112 may determine the resolution of the video stream based on the resolution of screen 125 and the number of the one or more windows to be displayed.

In some demonstrative embodiments, controller 112 may divide the resolution of screen 125 by the number of the one or more wireless video streams to be displayed.

In some demonstrative embodiments, controller 112 may divide the resolution of screen 125 by the number of the one or more wireless video streams plus one, for example, if the number of the one or more wireless video streams is an odd number.

In some demonstrative embodiments, controller 112 may select a resolution, which is closest to the quotient of the division.

In some demonstrative embodiments, controller 112 may feedback the selected resolution to the video source. The video source may set the selected resolution to the video stream.

In one example, the user may control display device 120 to concurrently display four windows, e.g., windows 121, 122, 123, and 124, to display video of wireless video streams 134, 144, 154 and 164, e.g., in windows 121, 122, 123, and 124.

For example, the resolution of screen 125 may be of 1920×1080 pixels. According to this example, controller 112 may divide the resolution of screen 125 by two in each dimension of screen 125, e.g., since screen 125 is to display four windows, which may result in a resolution of 960×540 pixels.

In some demonstrative embodiments, controller 112 may select from a plurality of resolutions, e.g., of 800×600 pixels, 1024×768 or 1280×720 pixels, a resolution, which is closest to the quotient of the division. For example, controller 112 may select a resolution of 1024×768 pixels, which is closest to the resolution of 960×540 pixels.

In some demonstrative embodiments, controller 112 may request each video source of video sources 131, 141, 151 and 162, to set the resolution of 800×600 pixels for encoding the video of wireless video streams 134, 144, 154 and/or 164.

In some demonstrative embodiments, setting a resolution of the video steam to a resolution of 800×600 pixels may reduce the bandwidth required for transmitting the video stream, e.g., compared to a resolution of 1920×1080 pixels, which may be required for a video stream to be displayed on the entirety of screen 125. Accordingly, a bandwidth required for concurrently transmitting of wireless video streams 134, 144, 154 and/or 164 may be reduced.

In some demonstrative embodiments, the reduced bandwidth required for the video stream may enable a smoother streaming and/or less glitches of the video stream, which, in turn, may enable an increased user experience.

In some demonstrative embodiments, controller 112 may request a video source of video sources 130, 140, 150 and/or 160 to set a resolution of a video stream generated by the video source based on the resolution of a window to display the video stream.

In some demonstrative embodiments, controller 112 may request the video source to set a first video stream resolution of the video stream for a first window resolution and a second, e.g., lesser, video stream resolution of the video stream for a second window resolution, for example, if the second window resolution is lesser than the first window resolution.

For example, controller 112 may request video source 131 to set a first resolution of 1920×1980 to the video stream to be displayed on window 121 having a resolution of 1920×1080, e.g., when window 121 is occupying the entirety of screen 125; and a second resolution of 1024×768 pixels to the video stream to be displayed on window 121 having a resolution of 1024×768 pixels, e.g., when window 121 is occupying part of screen 125.

In some demonstrative embodiments, controller 112 may request a video source of video sources 130, 140, 150 and/or 160 to halt transmission of a video stream generated by the video source, e.g., when the video stream is not to be displayed.

For example, controller 112 may request video source 131 to halt transmission of wireless video stream 134, for example, if the video stream of video source 131 is not to be displayed on screen 125.

In one example, the user of device 102 may control display device 120 to display video of wireless video stream 134 in window 121 such that window 121 is occupying the entirety of screen 125. Accordingly, the video of wireless video stream 134 may be encoded at a resolution of 1920×1080 pixels.

According to this example, controller 112 may request video source 141 to halt transmission of wireless video stream 144, controller 112 may request video source 151 to halt transmission of wireless video stream 154 and/or controller 112 may request video source 161 to halt transmission of wireless video stream 164, for example, since the video of wireless video streams 144, 154 and/or 164 are not to be displayed.

In some demonstrative embodiments, the user may control display device 120 to concurrently display the four windows, e.g., as described above.

Accordingly, controller 112 may request video source 141 to transmit wireless video stream 144, video source 151 to transmit wireless video stream 154 and/or video source 161 to transmit wireless video stream 164, for example, to enable concurrently displaying the video from video sources 131, 141, 151 and 161 in the four windows.

In some demonstrative embodiments, controller 112 may request video source 131 to set the resolution of the video stream back to a resolution of 1024×768 pixels, and video sources 141, 151 and/or 161 to encode the video at a resolution of 1024×768 pixels, for example, to decrees the required bandwidth when concurrently displaying the four windows.

In some demonstrative embodiments, controller 112 may request a video source of video sources 131, 141, 151 and/or 161 to set a first frame rate of a video stream generated by the video source, when a window displaying the video stream is active, and to set a second frame rate of the video stream, when the window is non-active.

In some demonstrative embodiments, the first frame rate may be greater than the second frame rate, e.g., to enable a relatively quick updating of the active window.

For example, a frame rate for a video stream to be displayed in an active window may be set to 30 fps and a frame rate for a video stream to be displayed in a non-active window may be set to 5 fps.

In one example, the user may perform one or more operations on window 121, which displays video of wireless video stream 134, while windows 122, 123 and/or 124 are non-active, e.g., only displaying video of wireless video streams 144, 154 and 164. Accordingly, controller 112 may request video source 131 to use the first frame rate for the video of wireless video stream 134, video source 141 to use the second frame rate for the video of wireless video stream 144, video source 151 to use the second frame rate for the video of wireless video stream 154, and/or video source 161 to use the second frame rate for the video of wireless video stream 164.

In some demonstrative embodiments, controller 112 may request a video source of video sources 131, 141, 151 and/or 161 to set a bit rate of a video stream generated by the video source based on a frame rate of the video stream and a size of a window displaying the video stream.

In some demonstrative embodiments, controller 112 may request the video source to set a first bit rate for a first frame rate and a first window size; and a second bit rate, e.g., lesser than the first bit rate, for a second screen size and a second frame rate, for example, if the second screen size is lesser than the first screen size and/or if the second frame rate is lesser than the first frame rate.

In one example, controller 112 may request video source 131 to set a first bit rate of 10 Mbps for the video stream generated by video source 131 and displayed on window 121, for example, if the frame rate of the video stream is 30 fps and/or window 121 is occupying the entirety of screen 125.

In another example, controller 112 may request video source 131 to set a second bit rate of 1 Mbps for the video stream generated by video source 131, for example, if the frame rate of the video stream is 5 fps and/or window 121 is occupying part of screen 125.

In some demonstrative embodiments, controller 112 may request a video source of video sources 131, 141, 151 and/or 161 to set the one or more attributes of a video stream transmitted by the video source based on at least one predefined criterion, which includes a quality of experience (QoE) criterion corresponding to the one or more wireless video streams, e.g., as described below.

The phrase "quality of experience (QoE)", as used herein, may relate to a measure of the user experience (UX) of a device, system and or service. QoE metrics may measure metrics that the user may perceive as a quality parameter of the user experience, for example, a delay time of a video stream, image quality of the video stream, and/or the like.

In some demonstrative embodiments, controller 112 may request the video source of video sources 131, 141, 151 and/or 161 to set the one or more attributes of the video stream based on the QoE criterion, for example, after requesting the video source to set the one or more attributes of the video stream based on the one or more windows attributes, e.g., as described below.

In other embodiments, controller 112 may request the video source of video sources 131, 141, 151 and/or 161 to set the one or more attributes of the video stream based on the QoE criterion, in addition to or instead of requesting the video source to set the one or more attributes of the video stream based on the one or more windows attributes.

In some demonstrative embodiments, the at least one predefined criterion may include a criterion relating to a drop rate of the video stream, a frame rate of the video stream, a bit rate of the video stream, and/or any other attribute.

In some demonstrative embodiments, controller 112 may request a video source of video sources 131, 141, 151 and/or 161 to set the bit rate of the video stream generated by the video source based on the drop rate of the video stream, e.g., as described below with reference to FIG. 2.

In some demonstrative embodiments, controller 112 may request the video source to increase the bit rate of the video stream, e.g., if the drop rate of the video stream is lesser than a first predefined threshold, and to decrease the bit rate of the video stream, e.g., if the drop rate of the video stream is greater than a second predefined threshold.

In one example, controller 112 may monitor a drop rate, e.g., a real-time transport protocol (RTP) packer drop rate, of the video stream of wireless video stream 134.

In some demonstrative embodiments, controller 112 may assure that the drop rate of the video stream is within a drop rate range, e.g., between the first predefined threshold and the second predefined threshold.

In some demonstrative embodiments, controller 112 may request video source 131 to reduce a bit rate of encoder 135 by a predefined adjustment step, e.g., of 1 Mbps, for example, if the monitored drop rate of the video of wireless video stream 134 is greater than the first predefined threshold.

For example, the drop rate of wireless video stream 134 may be greater than the first predefined threshold when an available bandwidth of wireless medium 103 is relatively low, e.g., due to interference from wireless video streams 144, 154 and/or 164 and/or other co-channel interference.

In some demonstrative embodiments, controller 112 may request video source 131 to increase the bit rate of encoder 135 by the predefined adjustment step, for example, if the monitored drop rate of wireless video stream 134 is lesser than the second predefined threshold.

For example, the drop rate of wireless video stream 134 may be lesser than the second predefined threshold when the available bandwidth of wireless medium 103 is relatively high, e.g., due to no transmission and/or less interference from wireless video streams 144, 154 and/or 164 and/or other co-channel interference. In some demonstrative embodiments, controller 112 may repeat requesting video source 131 to increase and/or decrease the bit rate of encoder 135, e.g., by the predefined adjustment step, for example, until the drop rate is within the drop rate range.

In some demonstrative embodiments, different sets of first and second predefined thresholds may be assigned for one or more video sources of video sources 130, 140, 150 and/or 160, for example, if video sources 131, 141, 151 and/or 161 may not have a similar drop rate; are not located at a same location, e.g., a room, a class, or the like; do not have a line of sight (LOS) between video sources 131, 141, 151 and/or 161; and/or have a comparable distance between video sources 131, 141, 151 and/or 161.

In some demonstrative embodiments, controller 112 may request a video source of video sources 131, 141, 151 and/or 161 to set the frame rate of the video stream generated by the video source based on the bit rate of the video stream.

In some demonstrative embodiments, controller 112 may request the video source to decrease the frame rate of the video stream if the bit rate of the video stream decreases.

In one example, controller 112 may monitor the bit rate and the frame rate of the video stream of wireless video stream 134.

In some demonstrative embodiments, controller 112 may detect the bit rate of the video stream of wireless video stream 134 is relatively low, for example, when the video stream is relatively simple, static, and/or has a relatively low rate of changes, and the frame rate is relatively high. Accordingly, controller 112 may request video source 131 to decrease the frame rate.

In some demonstrative embodiments, decreasing the frame rate of the video stream of wireless video stream 134 may reduce the bandwidth required for transmitting wireless video stream 134.

Figure 2:
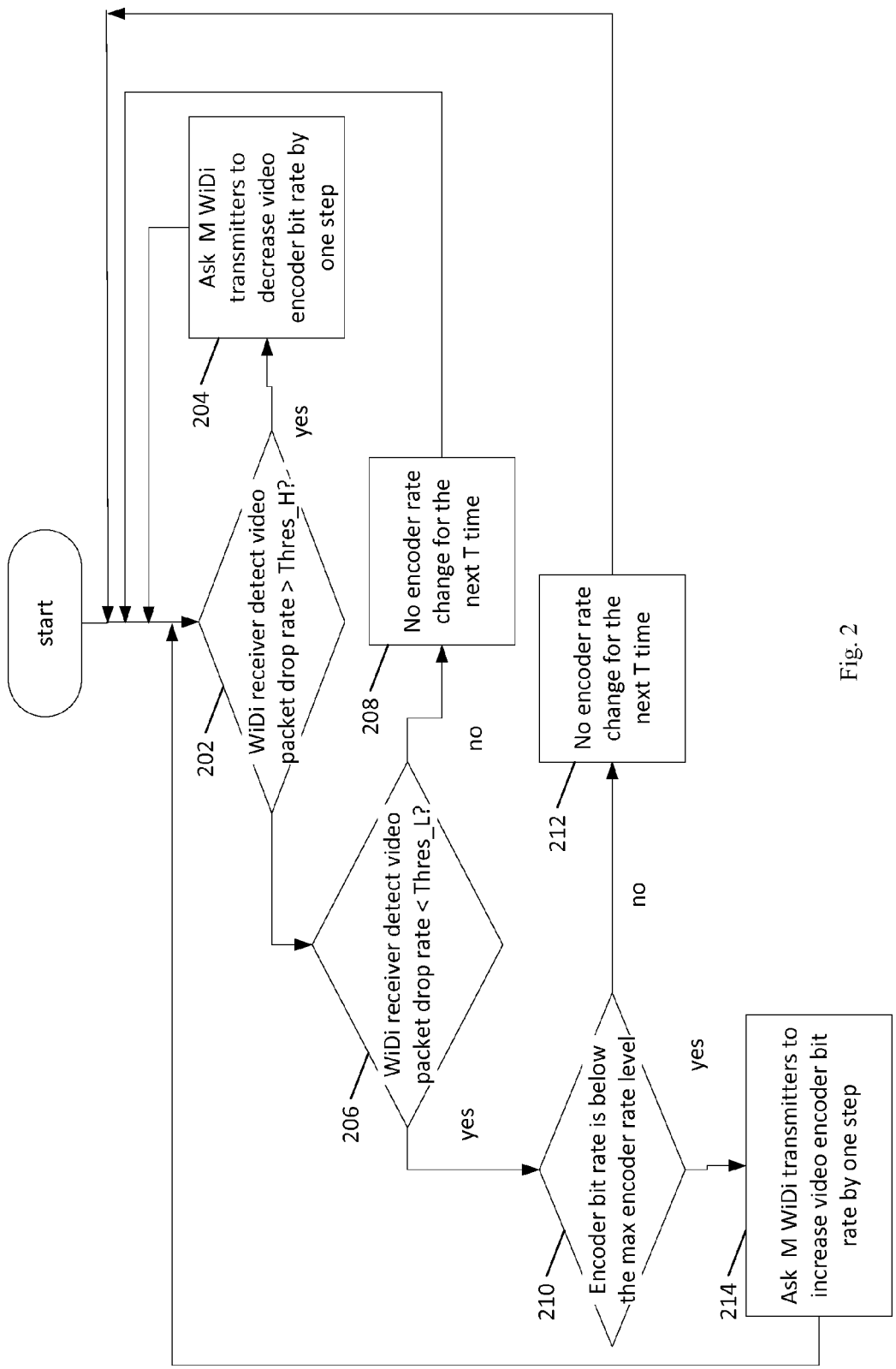
FIG. 2 is a flow chart illustration of a method of adjusting a bit rate of a video encoder, in accordance with some demonstrative embodiments.

Reference is made to FIG. 2, which schematically illustrates a flow chart illustration of a method of adjusting a bit rate of a video encoder, in accordance with some demonstrative embodiments. For example, one or more of the operations of the method of FIG. 2 may be performed by a wireless communication system, e.g., system 100 (FIG. 1); a wireless communication device, e.g., device 102 (FIG. 1); and/or a controller, e.g., controller 112 (FIG. 1).

As indicated at block 202, the method may include determining whether or not a drop rate of a video stream of a video source is above a first, e.g., a relatively high, threshold. For example, controller 112 (FIG. 1) may determine whether or not the drop rate of wireless video stream 134 (FIG. 1) is above the first predefined threshold, e.g., as described above.

As indicated at block 204, the method may include requesting the video source to decrease the bit rate by one step, e.g., if the drop rate is greater than the first threshold. For example, controller 112 (FIG. 1) may request video source 131 to decrease the bit rate by the predefined adjustment step, e.g., if the drop rate of wireless video steam 134 (FIG. 1) is greater than the first predefined threshold, e.g., as described above.

As indicated at block 206, the method may include determining whether or not the drop rate of the video stream of the video source is lesser than a second, e.g., a relatively low threshold. For example, controller 112 (FIG. 1) may determine whether or not the drop rate of wireless video stream 134 (FIG. 1) is lesser than the second predefined threshold, e.g., as described above.

As indicated at block 208, the method may include not requesting a change of the bit rate if the drop rate is not lesser than the second threshold.

As indicated at block 210, the method may include determining whether or not the encoder bit rate is lesser than a predefined maximal encoder bit rate, e.g., if the drop rate is lesser than the lower threshold. For example, controller 112 (FIG. 1) may determine whether or not the bit rate of encoder 135 (FIG. 1) is lesser than a predefined maximal encoder bit rate.

As indicated at block 212, the method may include not requesting a change of the bit rate if the bit rate is not lower than the predefined maximal encoder bit rate.

As indicated at block 214, the method may include requesting the video source to increase the bit rate by the predefined adjustment step, e.g., if the bit rate is lesser than predefined maximal encoder bit rate and the drop rate is lesser than the lower threshold. For example, controller 112 (FIG. 1) may request video source 131 to increase the bit rate by the predefined adjustment step, e.g., if the drop rate of wireless video steam 134 (FIG. 1) is lesser than the second predefined threshold, e.g., as described above.

Figure 3:
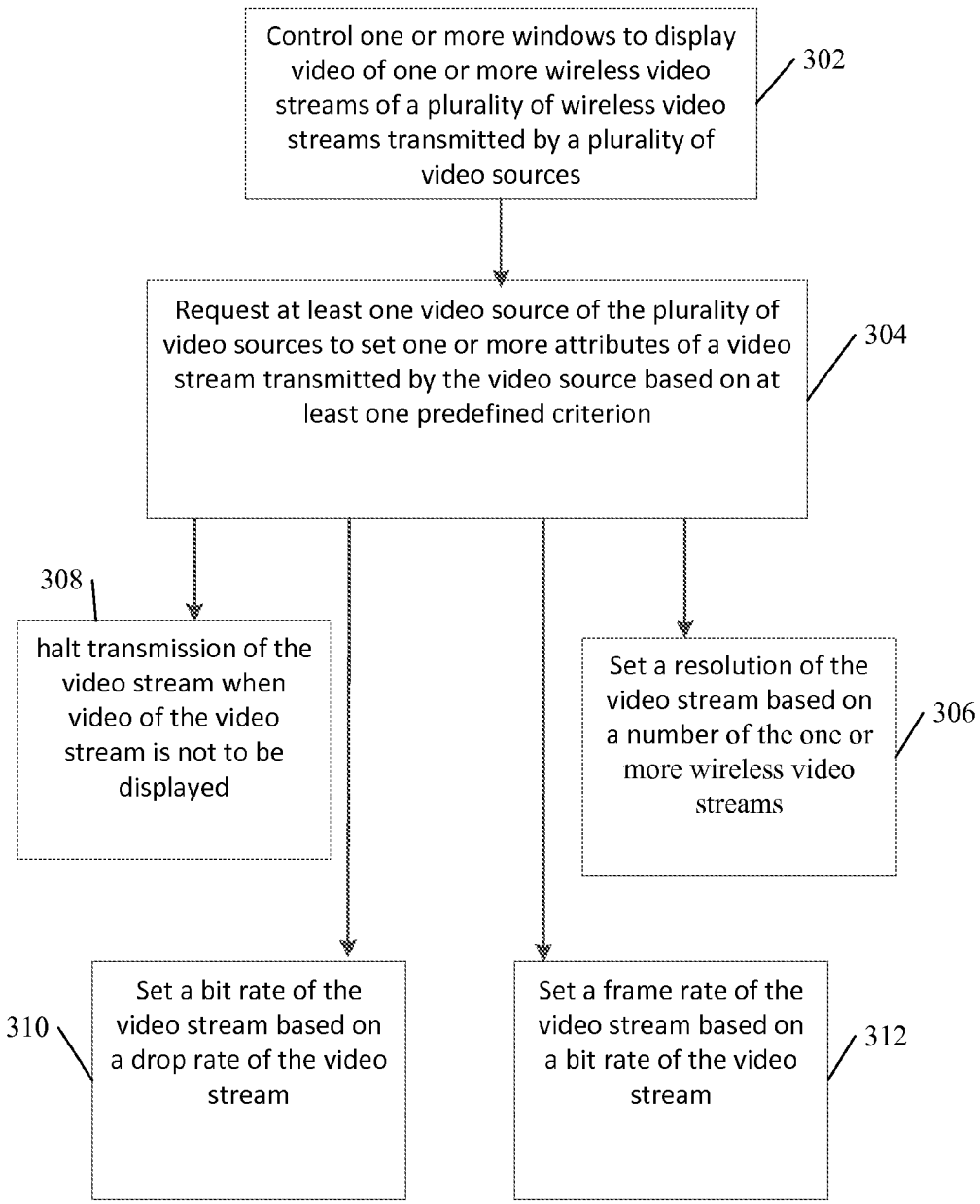
FIG. 3 is a schematic flow chart illustration of a method of controlling wireless transmission of video streams, in accordance with some demonstrative embodiments.

Reference is now made to FIG. 3, which schematically illustrates a flow chart illustration of a method of controlling wireless transmission of video streams, in accordance with some demonstrative embodiments. For example, one or more of the operations of the method of FIG. 3 may be performed by a wireless communication system, e.g., system 100 (FIG. 1); a wireless communication device, e.g., device 102 (FIG. 1); and/or a controller, e.g., controller 112 (FIG. 1).

As indicated at block 302, the method may include controlling one or more windows to display video of one or more wireless video streams of a plurality of wireless video streams transmitted by a plurality of video sources. For example, controller 112 (FIG. 1) may control windows 121, 122, 123 and/or 124 (FIG. 1) to display video of wireless video streams 134, 144, 154 and/or 164 (FIG. 1) transmitted by wireless video sources 131, 141, 151, and/or 161 (FIG. 1), e.g., as described above.

As indicated at block 304, the method may include requesting at least one video source of the plurality of video sources to set one or more attributes of a video stream transmitted by the video source based on at least one predefined criterion. For example, controller 112 (FIG. 1) may request video source 131 (FIG. 1) to set one or more attributes of the video stream transmitted by device 130 (FIG. 1) based on the at least one predefined criterion, e.g., as described above.

As indicated at block 306, the method may include setting a resolution of the video stream based on a number of the one or more wireless video streams. For example, controller 112 (FIG. 1) may request video source 131 (FIG. 1) to set a resolution of the video stream based on the number of the one or more wireless video streams, e.g., as described above.

As indicated at block 308, the method may include halting transmission of the video stream when video of the video stream is not to be displayed. For example, controller 112 (FIG. 1) may request video source 141 (FIG. 1) to halt transmission of wireless video stream 144 (FIG. 1) when the video stream of wireless video stream 144 (FIG. 1) is not to be displayed, e.g., as described above.

As indicated at block 310, the method may include setting the bit rate of the video stream based on the drop rate of the video stream. For example, controller 112 (FIG. 1) may request video source 131 (FIG. 1) to set the bit rate of the video stream based on the drop rate of the video stream of wireless video stream 134 (FIG. 1), e.g., as described above.

As indicated at block 312, the method may include setting the frame rate of the video stream based on the bit rate of the video stream. For example, controller 112 (FIG. 1) may request video source 131 (FIG. 1) to set the frame rate of the video stream based on the bit rate of wireless video stream 134 (FIG. 1), e.g., as described above.

Figure 4:
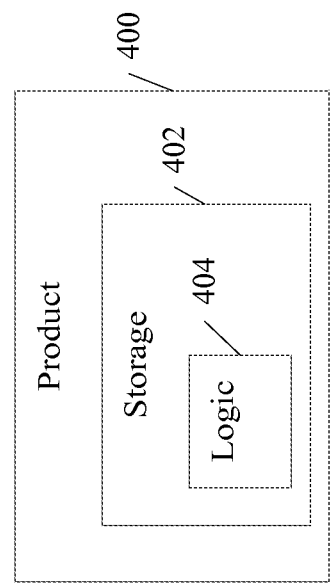
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 102 (FIG. 1), controller 112 (FIG. 1), and/or to perform one or more operations of the method of FIGS. 2 and/or 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a controller to control one or more windows to be displayed by a display device, the one or more windows to display video of one or more wireless video streams of a plurality of wireless video streams transmitted by a plurality of video sources, the controller is to request at least one video source of the plurality of video sources to set one or more attributes of a video stream transmitted by the video source based on at least one predefined criterion.

Example 2 includes the subject matter of Example 1 and optionally, wherein the attributes include at least one attribute selected from the group consisting of a resolution of the video stream, a frame rate of the video stream, a bit rate of the video stream, and whether or not the video stream is to be transmitted.

Example 3 includes the subject matter of Example 1 or 2 and optionally, wherein the at least one predefined criterion includes one or more window attributes relating to the one or more windows.

Example 4 includes the subject matter of Example 3 and optionally, wherein the one or more window attributes include at least one attribute selected from the group consisting of a number of the one or more video streams to be displayed, a resolution of a window of the windows to display video of the video stream, and whether or not the window is active.

Example 5 includes the subject matter of Example 4 and optionally, wherein the controller is to request the video source to set a resolution of the video stream based on the number of the one or more wireless video streams.

Example 6 includes the subject matter of Example 4 or 5 and optionally, wherein the controller is to request the video source to set a resolution of the video stream based on the resolution of the window.

Example 7 includes the subject matter of any one of Examples 4-6 and optionally, wherein the controller is to request the video source to halt transmission of the video stream when video of the video stream is not to be displayed.

Example 8 includes the subject matter of any one of Examples 4-7 and optionally, wherein the controller is to request the video source to set a frame rate of the video stream to a first rate, when the window is active, and to set the frame rate of the video stream to a second rate, when the window is non-active, the second rate is lesser than the first rate.

Example 9 includes the subject matter of any one of Examples 4-8 and optionally, wherein the controller is to request the video source to set a bit rate of the video stream based on a frame rate of the video stream and a size of the window.

Example 10 includes the subject matter of any one of Examples 1-9 and optionally, wherein the at least one predefined criterion includes a quality of experience (QoE) criterion corresponding to the one or more wireless video streams.

Example 11 includes the subject matter of any one of Examples 1-10 and optionally, wherein the at least one predefined criterion includes a criterion relating to at least one attribute selected from the group consisting of a drop rate of the video stream, a frame rate of the video stream and a bit rate of the video stream.

Example 12 includes the subject matter of Example 11 and optionally, wherein the controller is to request the video source to set the bit rate of the video stream based on the drop rate of the video stream.

Example 13 includes the subject matter of Example 12 and optionally, wherein the controller is to request the video source to decrease the bit rate of the video stream if the drop rate of the video stream is greater than a first predefined threshold and to increase the bit rate of the video stream if the drop rate of the video stream is lesser than a second predefined threshold.

Example 14 includes the subject matter of any one of Examples 11-13 and optionally, wherein the controller is to request the video source to set the frame rate of the video stream based on the bit rate of the video stream.

Example 15 includes the subject matter of Example 14 and optionally, wherein the controller is to request the video source to decrease the frame rate of the video stream if the bit rate of the video stream decreases.

Example 16 includes the subject matter of any one of Examples 1-15 and optionally, wherein the controller is to control a wireless communication unit to transmit a feedback to the video source, wherein the feedback includes the one or more attributes.

Example 17 includes the subject matter of any one of Examples 1-16 and optionally, wherein the one or more wireless video streams are to be transmitted over at least one link selected from the group consisting of a Wireless Fidelity (WiFi) link, a Wireless Display (WiDi) link, and a wireless gigabit (WiGig) Display Extension (WDE) link.

Example 18 includes a system comprising a display to display one or more windows including video of one or more wireless video streams of a plurality of wireless video streams transmitted by a plurality of video sources; at least one antenna to receive the one or more wireless video streams; and a controller to request at least one video source of the plurality of video sources to set one or more attributes of a video stream transmitted by the video source based on at least one predefined criterion.

Example 19 includes the subject matter of Example 18 and optionally, wherein the attributes include at least one attribute selected from the group consisting of a resolution of the video stream, a frame rate of the video stream, a bit rate of the video stream, and whether or not the video stream is to be transmitted.

Example 20 includes the subject matter of Example 18 or 19 and optionally, wherein the at least one predefined criterion includes one or more window attributes relating to the one or more windows.

Example 21 includes the subject matter of Example 20 and optionally, wherein the one or more window attributes include at least one attribute selected from the group consisting of a number of the one or more video streams to be displayed, a resolution of a window of the windows to display video of the video stream, and whether or not the window is active.

Example 22 includes the subject matter of Example 21 and optionally, wherein the controller is to request the video source to set a resolution of the video stream based on the number of the one or more wireless video streams.

Example 23 includes the subject matter of Example 21 or 22 and optionally, wherein the controller is to request the video source to set a resolution of the video stream based on the resolution of the window.

Example 24 includes the subject matter of any one of Examples 21-23 and optionally, wherein the controller is to request the video source to halt transmission of the video stream when video of the video stream is not to be displayed.

Example 25 includes the subject matter of any one of Examples 21-24 and optionally, wherein the controller is to request the video source to set a frame rate of the video stream to a first rate, when the window is active, and to set the frame rate of the video stream to a second rate, when the window is non-active, the second rate is lesser than the first rate.

Example 26 includes the subject matter of any one of Examples 21-25 and optionally, wherein the controller is to request the video source to set a bit rate of the video stream based on a frame rate of the video stream and a size of the window.

Example 27 includes the subject matter of any one of Examples 18-26 and optionally, wherein the at least one predefined criterion includes a quality of experience (QoE) criterion corresponding to the one or more wireless video streams.

Example 28 includes the subject matter of any one of Examples 18-27 and optionally, wherein the at least one predefined criterion includes a criterion relating to at least one attribute selected from the group consisting of a drop rate of the video stream, a frame rate of the video stream and a bit rate of the video stream.

Example 29 includes the subject matter of Example 28 and optionally, wherein the controller is to request the video source to set the bit rate of the video stream based on the drop rate of the video stream.

Example 30 includes the subject matter of Example 29 and optionally, wherein the controller is to request the video source to decrease the bit rate of the video stream if the drop rate of the video stream is greater than a first predefined threshold and to increase the bit rate of the video stream if the drop rate of the video stream is lesser than a second predefined threshold.

Example 31 includes the subject matter of any one of Examples 28-30 and optionally, wherein the controller is to request the video source to set the frame rate of the video stream based on the bit rate of the video stream.

Example 32 includes the subject matter of Example 31 and optionally, wherein the controller is to request the video source to decrease the frame rate of the video stream if the bit rate of the video stream decreases.

Example 33 includes the subject matter of any one of Examples 18-32 and optionally, wherein the controller is to control a wireless communication unit to transmit a feedback to the video source, wherein the feedback includes the one or more attributes.

Example 34 includes the subject matter of any one of Examples 18-33 and optionally, wherein the one or more wireless video streams are to be transmitted over at least one link selected from the group consisting of a Wireless Fidelity (WiFi) link, a Wireless Display (WiDi) link, and a wireless gigabit (WiGig) Display Extension (WDE) link.

Example 35 includes a method comprising controlling one or more windows to display video of one or more wireless video streams of a plurality of wireless video streams transmitted by a plurality of video sources; and requesting at least one video source of the plurality of video sources to set one or more attributes of a video stream transmitted by the video source based on at least one predefined criterion.

Example 36 includes the subject matter of Example 35 and optionally, wherein the attributes include at least one attribute selected from the group consisting of a resolution of the video stream, a frame rate of the video stream, a bit rate of the video stream, and whether or not the video stream is to be transmitted.

Example 37 includes the subject matter of Example 35 or 36 and optionally, wherein the at least one predefined criterion includes one or more window attributes relating to the one or more windows.

Example 38 includes the subject matter of Example 37 and optionally, wherein the one or more window attributes include at least one attribute selected from the group consisting of a number of the one or more video streams to be displayed, a resolution of a window of the windows to display video of the video stream, and whether or not the window is active.

Example 39 includes the subject matter of Example 38 and optionally, comprising requesting the video source to set a resolution of the video stream based on the number of the one or more wireless video streams.

Example 40 includes the subject matter of Example 38 or 39 and optionally, comprising requesting the video source to set a resolution of the video stream based on the resolution of the window.

Example 41 includes the subject matter of any one of Examples 38-40 and optionally, comprising requesting the video source to halt transmission of the video stream when video of the video stream is not to be displayed.

Example 42 includes the subject matter of any one of Examples 38-41 and optionally, comprising requesting the video source to set a frame rate of the video stream to a first rate, when the window is active, and requesting the video source to set the frame rate of the video stream to a second rate, when the window is non-active, the second rate is lesser than the first rate.

Example 43 includes the subject matter of any one of Examples 38-42 and optionally, comprising requesting the video source to set a bit rate of the video stream based on a frame rate of the video stream and a size of the window.

Example 44 includes the subject matter of any one of Examples 35-43 and optionally, wherein the at least one predefined criterion includes a quality of experience (QoE) criterion corresponding to the one or more wireless video streams.

Example 45 includes the subject matter of any one of Examples 35-44 and optionally, wherein the at least one predefined criterion includes a criterion relating to at least one attribute selected from the group consisting of a drop rate of the video stream, a frame rate of the video stream and a bit rate of the video stream.

Example 46 includes the subject matter of Example 45 and optionally, comprising requesting the video source to set the bit rate of the video stream based on the drop rate of the video stream.

Example 47 includes the subject matter of Example 46 and optionally, comprising requesting the video source to decrease the bit rate of the video stream if the drop rate of the video stream is greater than a first predefined threshold, and requesting the video source to increase the bit rate of the video stream if the drop rate of the video stream is lesser than a second predefined threshold.

Example 48 includes the subject matter of any one of Examples 35-47 and optionally, comprising requesting the video source to set the frame rate of the video stream based on the bit rate of the video stream.

Example 49 includes the subject matter of Example 48 and optionally, comprising requesting the video source to decrease the frame rate of the video stream if the bit rate of the video stream decreases.

Example 50 includes the subject matter of any one of Examples 35-49 and optionally, comprising transmitting a feedback to the video source, wherein the feedback includes the one or more attributes.

Example 51 includes the subject matter of any one of Examples 35-50 and optionally, wherein the one or more wireless video streams are to be transmitted over at least one link selected from the group consisting of a Wireless Fidelity (WiFi) link, a Wireless Display (WiDi) link, and a wireless gigabit (WiGig) Display Extension (WDE) link.

Example 52 includes a product including a non-transitory storage medium having stored thereon instructions that, when executed by a machine, result in controlling one or more windows to display video of one or more wireless video streams of a plurality of wireless video streams transmitted by a plurality of video sources; and requesting at least one video source of the plurality of video sources to set one or more attributes of a video stream transmitted by the video source based on at least one predefined criterion.

Example 53 includes the subject matter of Example 52 and optionally, wherein the attributes include at least one attribute selected from the group consisting of a resolution of the video stream, a frame rate of the video stream, a bit rate of the video stream, and whether or not the video stream is to be transmitted.

Example 54 includes the subject matter of Example 52 or 53 and optionally, wherein the at least one predefined criterion includes one or more window attributes relating to the one or more windows.

Example 55 includes the subject matter of Example 54 and optionally, wherein the one or more window attributes include at least one attribute selected from the group consisting of a number of the one or more video streams to be displayed, a resolution of a window of the windows to display video of the video stream, and whether or not the window is active.

Example 56 includes the subject matter of Example 55 and optionally, wherein the instructions result in requesting the video source to set a resolution of the video stream based on the number of the one or more wireless video streams.

Example 57 includes the subject matter of Example 55 or 56 and optionally, wherein the instructions result in requesting the video source to set a resolution of the video stream based on the resolution of the window.

Example 58 includes the subject matter of any one of Examples 55-57 and optionally, wherein the instructions result in requesting the video source to halt transmission of the video stream when video of the video stream is not to be displayed.

Example 59 includes the subject matter of any one of Examples 55-58 and optionally, wherein the instructions result in requesting the video source to set a frame rate of the video stream to a first rate, when the window is active, and requesting the video source to set the frame rate of the video stream to a second rate, when the window is non-active, the second rate is lesser than the first rate.

Example 60 includes the subject matter of any one of Examples 55-59 and optionally, wherein the instructions result in requesting the video source to set a bit rate of the video stream based on a frame rate of the video stream and a size of the window.

Example 61 includes the subject matter of any one of Examples 52-60 and optionally, wherein the at least one predefined criterion includes a quality of experience (QoE) criterion corresponding to the one or more wireless video streams.

Example 62 includes the subject matter of any one of Examples 52-61 and optionally, wherein the at least one predefined criterion includes a criterion relating to at least one attribute selected from the group consisting of a drop rate of the video stream, a frame rate of the video stream and a bit rate of the video stream.

Example 63 includes the subject matter of Example 62 and optionally, wherein the instructions result in requesting the video source to set the bit rate of the video stream based on the drop rate of the video stream.

Example 64 includes the subject matter of Example 63 and optionally, wherein the instructions result in requesting the video source to decrease the bit rate of the video stream if the drop rate of the video stream is greater than a first predefined threshold, and requesting the video source to increase the bit rate of the video stream if the drop rate of the video stream is lesser than a second predefined threshold.

Example 65 includes the subject matter of any one of Examples 52-64 and optionally, wherein the instructions result in requesting the video source to set the frame rate of the video stream based on the bit rate of the video stream.

Example 66 includes the subject matter of Example 65 and optionally, wherein the instructions result in requesting the video source to decrease the frame rate of the video stream if the bit rate of the video stream decreases.

Example 67 includes the subject matter of any one of Examples 52-66 and optionally, wherein the instructions result in transmitting a feedback to the video source, wherein the feedback includes the one or more attributes.

Example 68 includes the subject matter of any one of Examples 52-67 and optionally, wherein the one or more wireless video streams are to be transmitted over at least one link selected from the group consisting of a Wireless Fidelity (WiFi) link, a Wireless Display (WiDi) link, and a wireless gigabit (WiGig) Display Extension (WDE) link.

Example 69 includes an apparatus comprising means for controlling one or more windows to display video of one or more wireless video streams of a plurality of wireless video streams transmitted by a plurality of video sources; and means for requesting at least one video source of the plurality of video sources to set one or more attributes of a video stream transmitted by the video source based on at least one predefined criterion.

Example 70 includes the subject matter of Example 69 and optionally, wherein the attributes include at least one attribute selected from the group consisting of a resolution of the video stream, a frame rate of the video stream, a bit rate of the video stream, and whether or not the video stream is to be transmitted.

Example 71 includes the subject matter of Example 69 or 70 and optionally, wherein the at least one predefined criterion includes one or more window attributes relating to the one or more windows.

Example 72 includes the subject matter of Example 71 and optionally, wherein the one or more window attributes include at least one attribute selected from the group consisting of a number of the one or more video streams to be displayed, a resolution of a window of the windows to display video of the video stream, and whether or not the window is active.

Example 73 includes the subject matter of Example 72 and optionally, comprising means for requesting the video source to set a resolution of the video stream based on the number of the one or more wireless video streams.

Example 74 includes the subject matter of Example 72 or 73 and optionally, comprising means for requesting the video source to set a resolution of the video stream based on the resolution of the window.

Example 75 includes the subject matter of any one of Examples 72-74 and optionally, comprising means for requesting the video source to halt transmission of the video stream when video of the video stream is not to be displayed.

Example 76 includes the subject matter of any one of Examples 72-75 and optionally, comprising means for requesting the video source to set a frame rate of the video stream to a first rate, when the window is active, and means for requesting the video source to set the frame rate of the video stream to a second rate, when the window is non-active, the second rate is lesser than the first rate.

Example 77 includes the subject matter of any one of Examples 72-76 and optionally, comprising means for requesting the video source to set a bit rate of the video stream based on a frame rate of the video stream and a size of the window.

Example 78 includes the subject matter of any one of Examples 69-77 and optionally, wherein the at least one predefined criterion includes a quality of experience (QoE) criterion corresponding to the one or more wireless video streams.

Example 79 includes the subject matter of any one of Examples 69-78 and optionally, wherein the at least one predefined criterion includes a criterion relating to at least one attribute selected from the group consisting of a drop rate of the video stream, a frame rate of the video stream and a bit rate of the video stream.

Example 80 includes the subject matter of Example 79 and optionally, comprising means for requesting the video source to set the bit rate of the video stream based on the drop rate of the video stream.

Example 81 includes the subject matter of Example 80 and optionally, comprising means for requesting the video source to decrease the bit rate of the video stream if the drop rate of the video stream is greater than a first predefined threshold, and means for requesting the video source to increase the bit rate of the video stream if the drop rate of the video stream is lesser than a second predefined threshold.

Example 82 includes the subject matter of any one of Examples 69-81 and optionally, comprising means for requesting the video source to set the frame rate of the video stream based on the bit rate of the video stream.

Example 83 includes the subject matter of Example 82 and optionally, comprising means for requesting the video source to decrease the frame rate of the video stream if the bit rate of the video stream decreases.

Example 84 includes the subject matter of any one of Examples 69-83 and optionally, comprising means for transmitting a feedback to the video source, wherein the feedback includes the one or more attributes.

Example 85 includes the subject matter of any one of Examples 69-84 and optionally, wherein the one or more wireless video streams are to be transmitted over at least one link selected from the group consisting of a Wireless Fidelity (WiFi) link, a Wireless Display (WiDi) link, and a wireless gigabit (WiGig) Display Extension (WDE) link.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   at least one radio to concurrently communicate directly with a plurality of wireless communication devices over a plurality of wireless network communication links, and to receive a plurality of wireless video streams from a plurality of video sources via the plurality of wireless network communication links; and a controller to control two or more windows to be displayed by a display device, said two or more windows to display video of two or more wireless video streams of said plurality of wireless video streams, said controller is to send to at least one video source of said plurality of video sources at least one request to set one or more attributes of a video stream transmitted by said video source based at least on a drop rate of the video stream, said controller is to request said video source to set an encoding bit rate of said video stream based on a frame rate of said video stream and a size of a window to display video of said video stream, said controller is to request said video source to decrease the frame rate of said video stream if the encoding bit rate of said video stream decreases.

2. The apparatus of claim 1, wherein said attributes include at least one attribute selected from the group consisting of a resolution of said video stream, the frame rate of said video stream, the encoding bit rate of said video stream, and whether or not said video stream is to be transmitted.

3. The apparatus of claim 1, wherein said controller is to send said at least one request based on one or more window attributes relating to said two or more windows.

4. The apparatus of claim 3, wherein said one or more window attributes include at least one attribute selected from the group consisting of a number of said two or more video streams to be displayed, a resolution of the window to display video of said video stream, and whether or not said window is active.

5. The apparatus of claim 4, wherein said controller is to request said video source to set a resolution of said video stream based on the number of said two or more wireless video streams.

6. The apparatus of claim 4, wherein said controller is to request said video source to set a resolution of said video stream based on the resolution of said window.

7. The apparatus of claim 4, wherein said controller is to request said video source to halt transmission of said video stream when video of said video stream is not to be displayed.

8. The apparatus of claim 4, wherein said controller is to request said video source to set the frame rate of said video stream to a first rate, when said window is active, and to set the frame rate of said video stream to a second rate, when said window is non-active, said second rate is lesser than said first rate.

9. The apparatus of claim 1, wherein said controller is to send said at least one request based on a criterion relating to at least one attribute selected from the group consisting of the frame rate of said video stream and the encoding bit rate of said video stream.

10. The apparatus of claim 1, wherein said controller is to request said video source to set the encoding bit rate of said video stream based on the drop rate of said video stream.

11. The apparatus of claim 10, wherein said controller is to request said video source to decrease the encoding bit rate of said video stream if the drop rate of said video stream is greater than a first predefined threshold, and to increase the encoding bit rate of said video stream if the drop rate of said video stream is lesser than a second predefined threshold.

12. The apparatus of claim 1, wherein said controller is to cause said radio to transmit a feedback to said video source, wherein said feedback includes said one or more attributes.

13. The apparatus of claim 1, wherein said two or more wireless video streams are to be received over at least one link selected from the group consisting of a Wireless Fidelity (WiFi) link, a Wireless Display (WiDi) link, and a wireless gigabit (WiGig) Display Extension (WDE) link.

14. A system comprising:
a display to display two or more windows including video of two or more wireless video streams of a plurality of wireless video streams from a plurality of video sources;
at least one antenna to concurrently communicate directly with a plurality of wireless communication devices over a plurality of wireless network communication links, and to receive said plurality of wireless video streams via the plurality of wireless network communication links; and
a controller to send to at least one video source of said plurality of video sources at least one request to set one or more attributes of a video stream transmitted by said video source based at least on a drop rate of the video stream, said controller is to request said video source to set an encoding bit rate of said video stream based on a frame rate of said video stream and a size of a window to display video of said video stream, said controller is to request said video source to decrease the frame rate of said video stream if the encoding bit rate of said video stream decreases.

15. The system of claim 14, wherein said attributes include at least one attribute selected from the group consisting of a resolution of said video stream, the frame rate of said video stream, the encoding bit rate of said video stream, and whether or not said video stream is to be transmitted.

16. The system of claim 14, wherein said controller is to send said at least one request based on one or more window attributes relating to said two or more windows.

17. The system of claim 16, wherein said one or more window attributes include at least one attribute selected from the group consisting of a number of said two or more video streams to be displayed, a resolution of the window to display video of said video stream, and whether or not said window is active.

18. The system of claim 17, wherein said controller is to request said video source to set a resolution of said video stream based on the number of said two or more wireless video streams.

19. The system of claim 14, wherein said controller is to send said at least one request based on a criterion relating to at least one attribute selected from the group consisting of the frame rate of said video stream and the encoding bit rate of said video stream.

20. A method to be performed by a video display device, the method comprising:
concurrently communicating directly with a plurality of wireless communication devices over a plurality of wireless network communication links;
controlling, at the video display device, two or more windows to display video of two or more wireless video streams of a plurality of wireless video streams from a plurality of video sources via the plurality of wireless network communication links; and
transmitting at least one wireless transmission including at least one request to at least one video source of said plurality of video sources, the at least one request including a request to set one or more attributes of a video stream transmitted by said video source based at least on a drop rate of said video stream, a request to set an encoding bit rate of said video stream based on a frame rate of said video stream and a size of a window to display video of said video stream, and a request to decrease the frame rate of said video stream if the encoding bit rate of said video stream decreases.

21. The method of claim 20, wherein said attributes include at least one attribute selected from the group consisting of a resolution of said video stream, the frame rate of said video stream, the encoding bit rate of said video stream, and whether or not said video stream is to be transmitted.

22. The method of claim 20 comprising transmitting the at least one request based on a criterion relating to at least one attribute selected from the group consisting of the frame rate of said video stream and the encoding bit rate of said video stream.

23. A product including a non-transitory storage medium having stored thereon instructions that, when executed by a machine, result in:
concurrently communicating directly with a plurality of wireless communication devices over a plurality of wireless network communication links;
controlling two or more windows to display video of two or more wireless video streams of a plurality of wireless video streams from a plurality of video sources via the plurality of wireless network communication links; and
requesting at least one video source of said plurality of video sources to set one or more attributes of a video stream transmitted by said video source based at least on a drop rate of said video stream, to set an encoding bit rate of said video stream based on a frame rate of said video stream and a size of a window to display video of said video stream, and to decrease the frame rate of said video stream if the encoding bit rate of said video stream decreases.

24. The product of claim 23, wherein said attributes include at least one attribute selected from the group consisting of a resolution of said video stream, the frame rate of said video stream, the encoding bit rate of said video stream, and whether or not said video stream is to be transmitted.

25. The product of claim 23, wherein said instructions result in requesting said video source to set said attributes based on one or more window attributes relating to said two or more windows.

26. The product of claim 23, wherein said instructions result in requesting said video source to set said attributes based on at least one attribute selected from the group consisting of the frame rate of said video stream and the encoding bit rate of said video stream.

* * * * *